(12) United States Patent
Ishito

(10) Patent No.: US 6,507,703 B1
(45) Date of Patent: *Jan. 14, 2003

(54) CAMERA FOR PRODUCING A TRIMMED IMAGE

(75) Inventor: Fumiaki Ishito, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/618,139

(22) Filed: Jul. 17, 2000

(30) Foreign Application Priority Data

Jul. 19, 1999 (JP) .......................................... 11-204252

(51) Int. Cl.[7] ........................... G03B 17/00; G03B 13/10
(52) U.S. Cl. ............................. 396/60; 396/85; 396/379
(58) Field of Search .............................. 396/60, 85, 72, 396/379

(56) References Cited

U.S. PATENT DOCUMENTS

| 4,639,111 | A |   | 1/1987 | Harvey |  |
|---|---|---|---|---|---|
| 5,606,383 | A |   | 2/1997 | Daitoku et al. |  |
| 5,659,809 | A | * | 8/1997 | Nagao | 396/60 |
| 5,848,302 | A | * | 12/1998 | Machida | 396/60 |

FOREIGN PATENT DOCUMENTS

JP          5-61093         3/1993

* cited by examiner

Primary Examiner—Russell Adams
Assistant Examiner—Arthur A Smith
(74) Attorney, Agent, or Firm—Morrison & Foerster LLP

(57) ABSTRACT

This camera includes two kinds of photographing modes, a normal photographing mode and a trimming photographing mode of telephotographing in pseudo. The focal length variator for changing the focal length of a zoom lens is formed by a first cam corresponding to the normal photographing, a second cam corresponding to trimming photographing, and a transition area cam connecting the first cam and the second cam. Thus, at the time of transition from the normal photographing mode to the trimming photographing mode, or the transition from the trimming photographing mode to the normal photographing mode, the focal length of the zoom lens is changed to the focal length corresponding to the photographing mode by zooming operation to facilitate change of the photographing mode and always set a view finder to a suitable angle of view corresponding to the focal length set in the zoom lens.

16 Claims, 5 Drawing Sheets

CAMERA FOR PRODUCING A TRIMMED IMAGE

This application is based on the patent application No. 11-204252 filed in Japan, the contents of which are hereby incorporated by reference.

BACKGROUND OF THE INVENTION

1. Field of the Invention

This invention relates to a camera and particularly to the camera capable of producing a trimmed image to be scheduled for printing a part of photographic image in a subsequent printing process.

2. Prior Art

Generally in a camera using a zoom lens as a photographing lens, the focal length of a finder lens is varied interlocking with the zooming operation to make the angle of view of the photographing lens coincide with the angle of view of the finder.

With such a camera, in normal photographing, the range of a field of view confirmed through the finder is photographed, so it is not a special obstacle to photographing.

Further, it is known that a trimming photographing camera is capable of obtaining a picture having a pseudo telephotographic effect as if it is photographed by a telephoto lens by trimming the top and bottom and left and right of a photographed image in printing. This camera is adapted to trim the top and bottom and left and right of a photographing image plane in a subsequent printing process according to the trimming information preset in photographing and enlarge the image plane to be printed, thereby obtaining a photo having a pseudo telephotographic effect. Such a photographing mode of being scheduled for printing a part of a photographed image plane in printing will be called trimming photographing mode herein after.

Furthermore, it is called a substantial focal length when it includes a real focal length in normal mode, and a pseudo focal length in trimming mode.

In the case of photographing in the trimming mode with this camera, since the angle of view corresponding to the pseudo focal length does not coincide with the angle of view of the finder, it is necessary that only the angle of view of the finder is changed to make the range of visual field of the finder match the image range of a photo obtained by trimming in subsequent printing process, and the range to be trimming photographed can be confirmed through the viewfinder.

Therefore, it has been proposed that in the zoom lens type camera capable of trimming photographing, at the time of trimming photographing, a converter lens is inserted in a finder optical system to change the angle of view of the finder only to the angle of view of pseudo telephotographing (See Japanese Patent Laid-Open No. Hei 4-335332).

In addition to this, it has been proposed that the focal length of an objective lens of the finder optical system is changed to change the angle of view of the finder only (See Japanese Patent Laid-Open No. Hei 5-61093).

In the known zoom lens type camera capable of trimming photographing, zooming operation is conducted in the normal photographing mode, the focal length of the photographing lens is moved to the telephoto side to be set to the maximum focal length, and then when zooming operation is further conducted, it is switched from the normal photographing mode to the trimming photographing mode, and with the zoom lens still set to the maximum focal length, the trimming magnification is increased, whereby the pseudo focal length is increased so as to obtain a printed image with a larger telephotographic effect than that in the normal photographing mode.

In this constitution, it is desired that also in the trimming photographing mode, similarly to the case of photographing in the normal photographing mode, the optimum photographing magnification, that is, the optimum substantial focal length can be set, and it is desirable that in switching from the normal photographing mode to the trimming photographing mode, the substantial focal length is continuously varied to set an arbitrary pseudo focal length. The continuous variation of the pseudo focal length, however, has the disadvantage that since an arbitrary trimming magnification is set in every photographing, setting of trimming magnification in print work becomes complicated.

Therefore, in the camera disclosed in Japanese Patent Laid-Open No. Hei 4-335332, the trimming magnification is previously set to plural, and in switching from the normal photographing mode to the trimming photographing mode, the focal length of a zoom lens is changed to the wide angle side so that the real focal length set in the photographing lens before switching becomes substantially equal to the pseudo focal length in the trimming photographing mode after switching.

According to such constitution, the angle of view of the finder before and after switching the photographing mode is substantially kept constant, but during switching of the photographing mode, the zooming operation is temporarily stopped, resulting in giving a feeling of physical disorder to a user.

Further, in such constitution, it is necessary to provide a space and a special driving mechanism for inserting and separating a converter lens in and from the interior of the finder, which results in the disadvantage that the camera becomes bulky.

On the other hand, in the configuration where the focal length of the objective lens in the finder optical system is changed to change only the angle of view of the finder, there is provided a structure of moving the objective lens of the finder optical system by a finder cam driven interlocking with rotation of the zoom ring of the photographing lens to change the focal length of the objective lens.

The finder cam is provided with two sets of cam grooves, a cam groove used in the case of photographing in the normal mode and a cam groove used in the case of photographing in the trimming photographing mode, whereby in the case of switching from the normal mode to the trimming photographing mode or switching inversely, that is, switching the photographing mode, one of the cam grooves suitable to the photographing mode is selected to move the objective lens of the finder optical system.

However, switching to one of the cam grooves suitable to the photographing mode can not be performed in the middle position of the maximum and minimum focal length of the objective lens of the finder optical system structurally, but switching between the cam grooves can be performed in the position of the maximum or minimum focal length of the objective lens, that is, only at the ends of the cam grooves.

Therefore, the disadvantage is that every time the photographing mode is switched, the zoom ring of the photographing lens is operated to set the focal length of the photographing lens to the maximum or minimum value, that is, to set the photographing lens to the limit position on the telephoto side or the wide angle side, and the finder cam interlocking with the zoom ring should be moved to locate an engagement pin for driving the objective lens of the finder optical system at the end of the cam groove.

SUMMARY OF THE INVENTION

The present invention has been made in view of the above circumstances and provides a camera capable of simply switching between two kinds of photographing modes, the normal photographing mode and the trimming photographing mode capable of telephotographing in pseudo by the zooming operation.

Further, the invention provides a camera which is capable of switching between two kinds of photographing modes, the normal photographing mode and the trimming photographing mode and includes a view finder in which a suitable angle of view is always set corresponding to the focal length set in a zoom lens by switching the photographing mode.

Further, the invention provides a camera including a zoom lens in which plural focal lengths are previously set for the normal photographing area corresponding to the normal photographing mode and the trimming photographing area corresponding to the trimming photographing mode, respectively, and a view finder in which a suitable angle of view is always set corresponding to the focal length set in the zoom lens.

Another aspect of the invention will be known from the detailed description of the invention with reference to the attached drawings.

DETAILED DESCRIPTION OF THE PREFERRED EMBODIMENTS

The embodiments of the invention will now be described. The following embodiments are examples of implementing the invention and not restrictive. This camera is capable of automatically continuously performing the transition from the telephoto end in the normal photographing mode to the trimming photographic mode, that is, the photographing mode of being scheduled to print only a part of a photographing image plane in printing, and so constructed that at the time of transition from the normal photographing area to the trimming photographing area, the angle of view (magnification) of the finder is continuously varied not to give a feeling of physical disorder to a photographer.

First Embodiment

Figure 1:
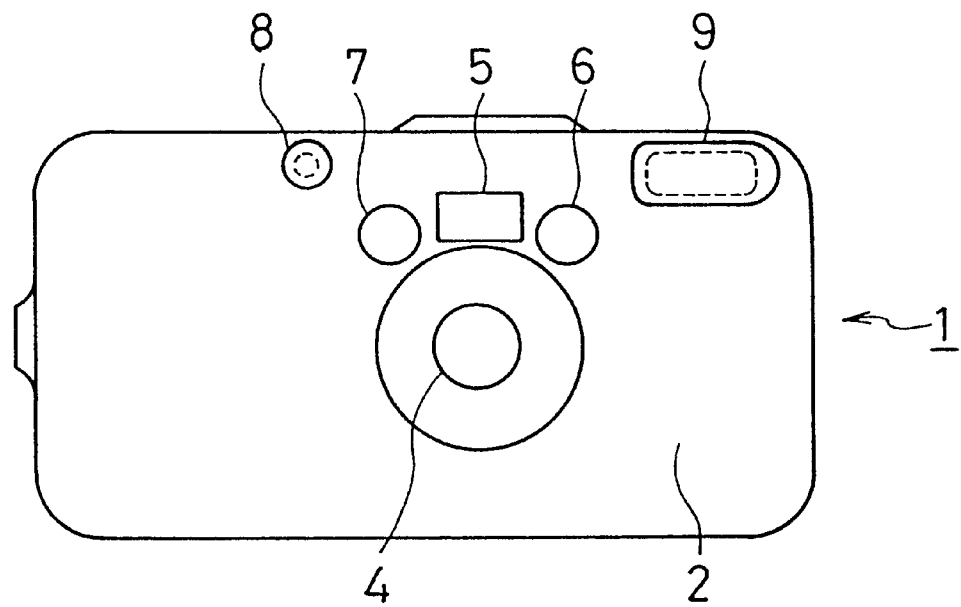
FIG. 1 is a front view showing the appearance of a camera capable of trimming photographing according to the embodiments of the invention.
Figure 2:
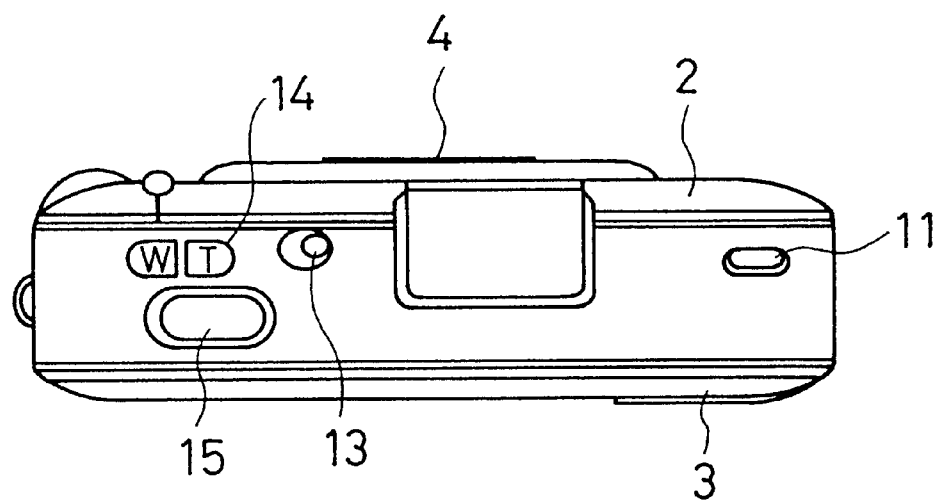
FIG. 2 is a top view of a camera capable of trimming photographing shown in FIG. 1.

FIG. 1 is a front view showing the appearance of a camera according to one embodiment of the invention, and FIG. 2 is a top view thereof. In FIGS. 1 and 2, a camera 1 is provided with a front panel 2 and a rear cover 3, and a zoom lens 4 constituting the photographing optical system is collapsibly arranged in the center of the panel 2.

A zoom finder 5 capable of varying the finder magnification is disposed above the zoom lens 4, a projection window 6 and a photo-detecting window 7 for measuring the object distance are arranged on the right side, and the left side thereof, respectively. The reference numeral 8 is a photometric part, and 9 is a flashlight emitting part. The flash light emitting part 9 is disposed enough apart from the zoom lens 4 to prevent the occurrence of a red eye phenomenon (in the case of flash photographing, the eyes of a person as an object come out red).

A main switch 11 for turning on and off the power supply, a rewind switch 13, a zoom switch 14 and an exposure start switch 15 are provided on the top of the camera 1.

The outline of operation of the camera will now be described. First, in the initial state where the power is applied to the camera, the normal photographing mode is set. In such a state, when the zoom switch 14 is operated, the zoom lens 4 constituting the photographing optical system and the finder lens constituting the finder optical system are driven so that the focal length of the zoom lens 4 is changed and the angle of view (magnification) of the finder 5 is changed interlocking with the driving of zoom lens 4.

When the focal length of the zoom lens 4 reaches the end of the telephoto side in the normal photographing mode, continued operation of the zoom switch 14 to the telephoto side, automatically causes the transition to the trimming photographing mode. At this time, to continuously change the angle of view of the finder optical system, the zoom lens 4 is once moved to the wide angle side in the transition area mentioned later, so that the focal length is set to make the size of picture by trimming process coincide with the angle of view of the finder optical system.

Further, upon continued operation of the zoom switch 14 to the telephoto side, the focal length of the zoom lens 4 is moved to the telephoto side in the trimming photographing mode, and with the movement, the angle of view (magnification) of the finder 5 is also changed.

In the trimming-photographing mode, when the zoom switch 14 is operated to the wide-angle side, the focal length of the zoom lens 4 is moved from the telephoto side to the wide-angle side, and with the movement, the angle of view (magnification) of the finder 5 is also changed. When the focal length of the zoom lens 4 reaches the end on the wide-angle side in the trimming photographing mode, automatically the transition to the normal photographing mode occurs. At this time, to continuously change the angle of view of the finder optical system, the zoom lens 4 is once moved to the telephoto side in the transition area mentioned later, so that the real focal length corresponding to the angle of view of the finder optical system is set.

Upon continued operation of the zoom switch 14 further to the wide-angle side, the focal length of the zoom lens 4 is moved to the wide-angle side in the normal photographing mode, and with the movement, the angle of view (magnification) of the finder 5 is also changed.

Figure 3:
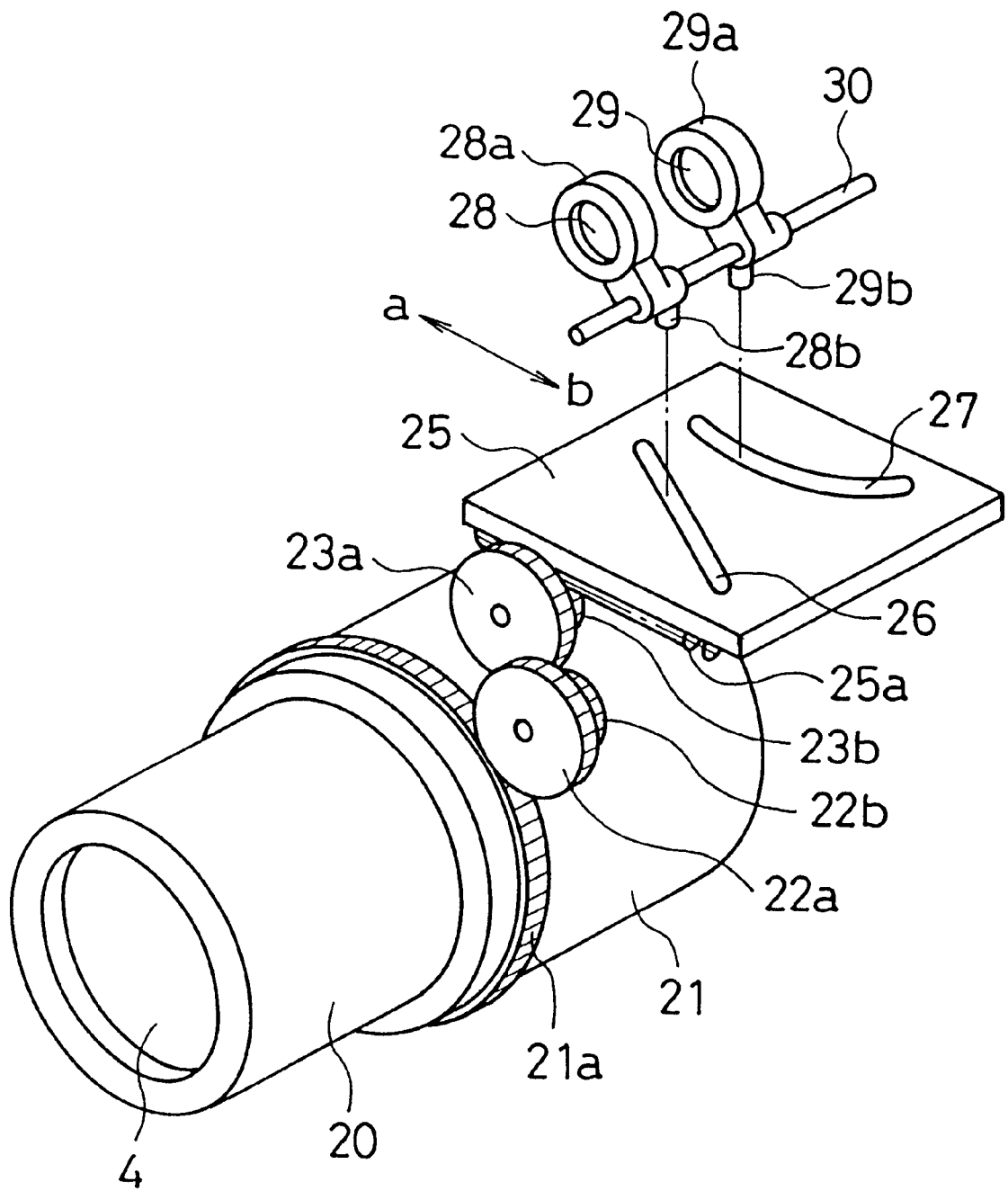
FIG. 3 is a perspective view for explaining the principal part of the configuration of a photographing optical system and a finder optical system according to a first embodiment.

FIG. 3 is a perspective view showing the principal part of the configuration of the photographing optical system and the finder optical system, and FIG. 4 is a diagram showing the relationship among the turning angle of a zoom cam ring for driving the zoom lens constituting the photographing optical system, the focal length of the zoom lens and angle of view of the finder optical system. The configuration of the photographing optical system and the finder optical system will now be described with reference to FIGS. 3 and 4.

In FIG. 3, the reference numeral 20 is a rectilinear lens barrel for holding the zoom lens 4, the reference numeral 21 is a zoom cam ring, the structure of a known zoom lens is provided in the interior of the rectilinear lens barrel 20 and the zoom cam ring 21, and when the zoom cam ring 21 is rotated by zooming operation, the rectilinear lens barrel 20 is moved so that a desired focal length is set in the zoom lens 4.

The zoom cam ring 21 is driven by a zoom motor which is a driving source not shown, and the turning angle of the zoom cam ring 21 is detected by an encoder not shown to be used as focal length information on the zoom lens 4.

The reference numeral 25 is a finder cam for driving finder lenses 28 and 29 mentioned later. The finder cam 25 is provided with a rack 25a formed on the lower surface thereof, on the other hand, a gear 21a is formed on the outside of the zoom cam ring 21, and interlocking gears 22a, 22b and the interlocking gears 23a, 23b are disposed between the gear 21a and the rack 25a.

The finder cam 25 is provided with cam grooves 26 and 27 for driving the finder lenses 28 and 29, on the other hand, the finder lenses 28 and 29 are respectively held on the lens holding members 28a and 29a, and the lens holding members 28a, 29a are held by a guide shaft 30 to be freely moved forward and backward. The projections 28b and 29b provided on the lens holding members 28a and 29a are respectively fitted in the cam grooves 26 and 27.

When the zoom cam ring 21 is rotated by zooming operation, the rotation is transmitted through a gear 21a and interlocking gears 22a, 22b and 23a, 23b to the rack 25a of the lower surface of the finder cam 25 to move the finder cam 25 in the directions of arrows (a) and (b) (opposite direction to the direction of the arrow (a). The movement in the directions of the arrows (a) and (b) of the finder cam 25 is transmitted through the projections 28b and 29b fitted in the cam grooves 26 and 27 to the lens holding members 28a and 29a, whereby the finder lenses 28 and 29 are moved to the positions corresponding to the focal length set in the zoom lens 4, and the magnification of the finder corresponding to the focal length of the zoom lens 4 is set in the finder.

The relationship among the turning angle of the zoom cam ring for driving the zoom lens constituting the photographing optical system, the focal length of the zoom lens and the angle of view of the finder optical system will now be described with reference to FIGS. 4(a) and 4(b).

Figure 4A:
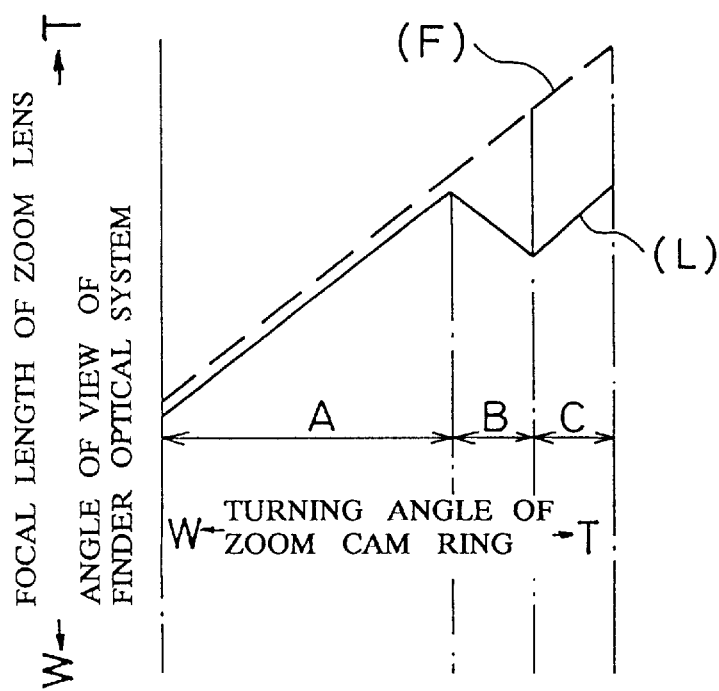
FIGS. 4(a) and 4(b) are diagrams for explaining the relationship among the turning angle of a zoom cam, the focal length of a zoom lens and the angle of view of the finder optical system according to the first embodiment.

FIG. 4(a) is a diagram showing the relationship among the turning angle of the zoom cam ring, the real focal length of the zoom lens and the angle of view of the finder optical system, in which the turning angle of the zoom cam ring 21 is used to enter the horizontal axis, and the focal length of the zoom lens 4 and the angle of view of the finder optical system are used to enter the vertical axis.

In FIG. 4(a), the reference sign A designates a normal photographing area, C designates a trimming photographing area, and B designates a transition area. The reference sign L is a line showing the change of the real focal length of the zoom lens, and the reference sign F is a line showing the change of angle of view of the finder optical system.

Figure 4B:
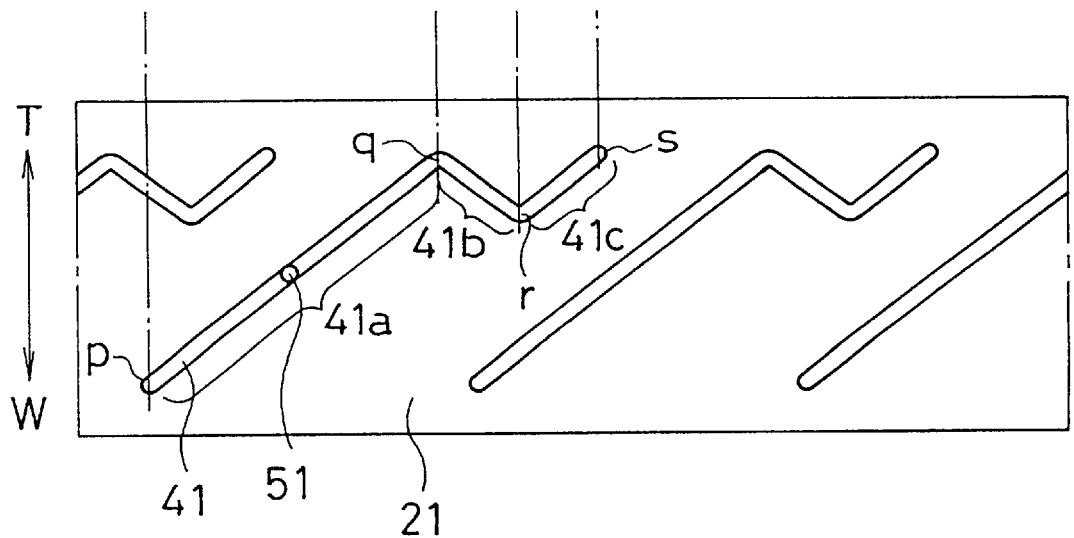

FIG. 4(b) is a development for explaining the cam groove of the zoom cam ring 21, the reference numeral 41 is a cam groove, the reference numeral 51 is a cam follower provided on the rectilinear lens barrel, which is engaged with the cam groove 41. The cam groove 41 is formed by a first cam groove 41a corresponding to the normal photographing area A, a second cam groove 41c corresponding to the trimming photographing area C, and a cam groove 41b of the transition area B connecting the first cam groove 41a and the second cam groove 41c, and when the zoom cam ring 21 is turned (moved in the lateral direction in FIG. 4(b)), the cam follower 51 is moved in the directions of arrows T and W (vertical direction in FIG. 4(b)) so that the focal length of the zoom lens 4 is changed. In the transition area B, the photographing mode is switched from the normal photographing mode to the trimming photographing mode.

When the cam follower 51 is put in the position (p) of the first cam groove 41a corresponding to the normal photographing area A, the focal length of the zoom lens 4 is set to the maximum wide angle position at the end on the wide angle side. When the zoom cam ring 21 is turned from such a state by zooming operation, the cam follower 51 moved toward the telephoto side in the first cam groove 41a so that the focal length of the zoom lens 4 is changed to the telephoto side. In the position (q), it is set in the maximum telephoto position.

When the zooming operation is further performed, the cam follower 51 is moved from the position (q) in the cam groove 41b of the transition area B to reach the position (r), and in the meantime, the real focal length of the zoom lens 4 is changed to the wide-angle side. This is for making the focal length of the zoom lens come to the focal length of the zoom lens 4 in the trimming photographing mode.

When the zooming operation is further performed, the cam follower 51 is moved from the position (r) toward the telephoto side in the second cam groove 41c corresponding to the trimming photographing area C, so that the focal length of the zoom lens 4 is changed to the telephoto side. In the position (s), it is set in the maximum telephoto position in the trimming photographing mode.

As clear from the above configuration, though the focal length of the zoom lens 4 of the photographing optical system is continuously changed by rotation of the zoom cam ring 21, at the time of switching from the normal photographing mode to the trimming photographing mode, the focal length of the zoom lens 4 is once changed from the end on the telephoto side in the normal photographing mode to the wide angle side. This is for making the angle of view to be printed at a switching point in the trimming photographing mode approach the angle of view of photographing at the end on the telephoto side in the normal photographing mode, whereby at the time of transition from the normal photographing mode to the trimming photographing mode, the angle of view of the finder is kept from suddenly changing.

On the other hand, when the zoom cam ring 21 is turned, simultaneously the finder lenses 28, 29 are also continuously varied in magnification so that switching can be continuously and easily executed without a feeling of physical disorder.

In this configuration, in the transition area B of switching from the normal photographing mode area to the trimming photographing mode, the substantial focal length and the angle of view of the finder do not agree, so photographing may be inhibited.

Second Embodiment

In the described first embodiment, switching from the normal photographing mode to the trimming photographing mode or from the trimming photographing mode to the normal photographing mode can be performed by turning the zoom cam ring to continuously change the focal length of the zoom lens of the photographing optical system, but as described above, in the transition area of switching from the normal photographing area to the trimming photographing area, the substantial focal length and the angle of view of the finder do not coincide.

According to the second embodiment, the focal length of the zoom lens of the photographing optical system is changed in stages by turning the zoom cam ring in the first embodiment to cause a stepped zoom, whereby a mismatch portion between the substantial focal length in the transition area and the angle of view is avoided not to give a feeling of physical disorder in camera operation.

Figure 5A:
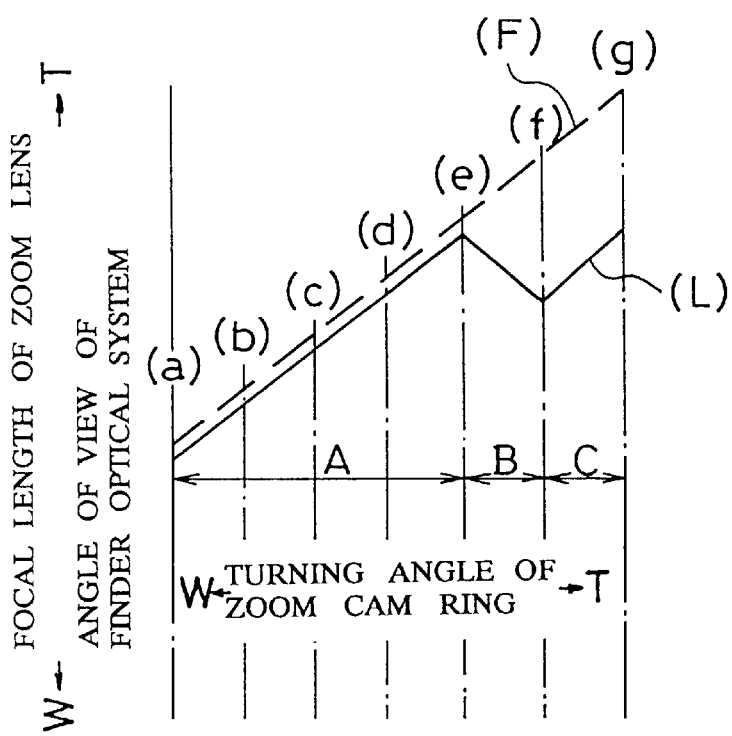
FIGS. 5(a) and 5(b) are diagrams for explaining the relationship among the turning angle of a zoom cam, the focal length of a zoom lens and the angle of view of the finder optical system according to a second embodiment.
Figure 5B:
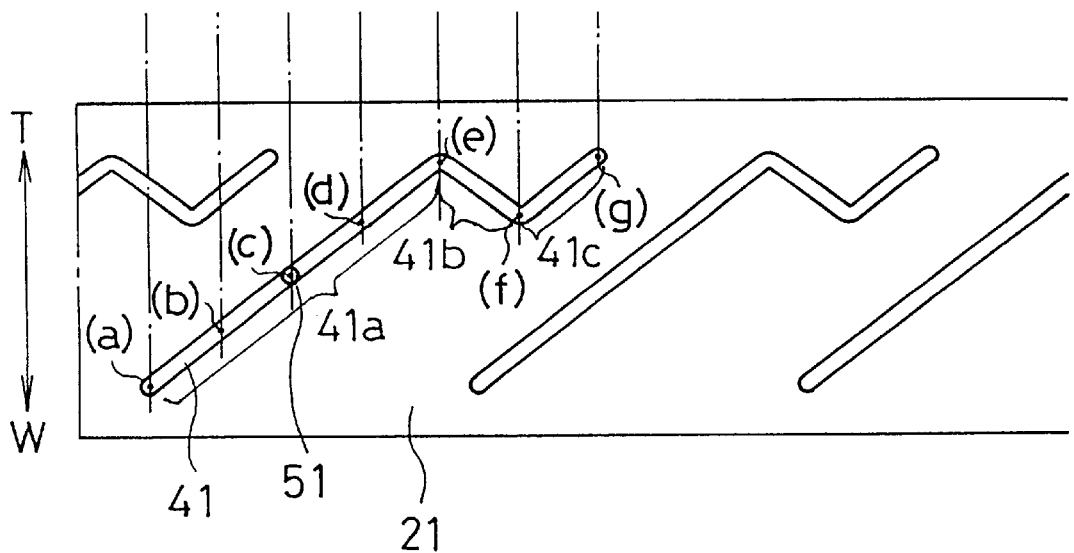

FIGS. 5(a) and 5(b) are diagrams for explaining the relationship among the turning angle of the zoom cam ring, the real focal length of the zoom lens and the angle of view of the finder optical system in the second embodiment. The configurations of the photographing optical system and the finder optical system are not different from those of the first embodiment shown in FIG. 3, and the general configuration of the camera is not different from that of the first embodiment shown in FIGS. 1 and 2, so the description is omitted.

FIG. 5(a) is a diagram showing the relationship among the turning angle of the zoom cam ring, the real focal length of the zoom lens and the angle of view of the finder optical system, in which the turning angle of the zoom cam ring 21 is used to enter the horizontal axis, and the real focal length of the zoom lens 4 and the angle of view of the finder optical system are used to enter the vertical axis.

In FIG. 5(a) the reference sign A designates the normal photographing area, C designates the trimming photographing area, and B designates the transition area. The reference sign L shows the change of real focal length of the zoom lens and F is a line showing the change of angle of view of the finder optical system.

As the stepped zoom is adopted, the focal length of the zoom lens of the photographing optical system is determined depending on the turning angle (a), (b), (c), (d), (e), (f), (g) of the zoom cam ring 21.

FIG. 5(b) is a development for explaining the cam groove of the zoom cam ring, which is not different from that of the first embodiment, so the same reference numerals designate the same members. In FIG. 5(b), the reference numeral 21 is a zoom cam ring, 41 is a cam groove of the zoom cam ring 21, the reference numeral 51 is a cam follower provided on the rectilinear propagation lens barrel, which is engaged with the cam groove 41.

The cam groove 41 is formed by a first cam groove 41a corresponding to the normal photographing area A, a second cam groove 41c corresponding to the trimming photographing area C, and a cam groove 41b of the transition area B connecting the first cam groove 41a and the second cam groove 41c, and when the zoom cam ring 21 is turned (moved in the lateral direction in FIG. 5(b)), the cam follower 51 is moved in the directions of arrows T and W (vertical direction in FIG. 5(b)), so that the focal length of the zoom lens 4 is changed. The transition area B is an area where the photographing mode is switched from the normal photographing mode to the trimming photographing mode, and the zoom cam ring 21 is not stopped, which is an area independent of photographing.

As described above, the stepped zoom is adopted so that the rotation of the zoom cam ring 21 is stopped at angles of rotation (a), (b), (c), (d), (e), (f), (g), and in the other middle positions, it is not stopped. The configuration may adopt an arbitrary known configuration.

In the normal photographing mode, the rotation of the zoom cam ring 21 is stopped in positions (a), (b), (c), (d), (e), and the cam follower 51 is set in the appropriate position of the cam groove 41. That is, when the cam follower 51 is put in a position (a) of the cam groove 41, the focal length of the zoom lens is set to the maximum wide angle, and when the cam follower 51 is put in the position (e) of the cam groove 41, the focal length of the zoom lens is set to the maximum telephoto.

When the zoom cam ring 21 is further turned, switching from the normal photographing mode to the trimming photographing mode is performed, the rotation of the zoom cam ring 21 is stopped in the positions (f), (g), and the cam follower 51 is set in the appropriate position of the cam groove 41. That is, when the cam follower 51 is put in the position (f) of the cam groove 41, the real focal length of the zoom lens is set to a first focal length (first telephoto) of the trimming photographing mode, and when the cam follower 51 is put in the position (g) of the cam groove 41, the real focal length of the zoom lens is set to a second focal length (second telephoto) of the trimming photographing mode. The focal length of the second telephoto is larger than the focal length of the first telephoto and set to the maximum telephoto position.

On the other hand, when the zoom cam ring is rotated, simultaneously the finder lenses 28 and 29 are continuously varied in magnification to the telephoto side, the rotation of the zoom cam ring 21 is stopped in the positions (a), (b), (c), (d), (e), (f), (g), and in the other middle positions, it is not stopped, whereby the angle of view of the finder is also set to the angle of view corresponding to the substantial focal length in the positions (a), (b), (c), (d), (e), (f), (g).

Thus, in switching from the normal photographing mode to the trimming photographing mode, or switching inversely, a feeling of physical disorder is not caused, switching of the photographing mode can be also continuously executed easily, and in the transition area where the substantial focal length set in the zoom lens and the angle of view of the finder do not coincide, the zoom cam ring is not stopped and avoided not to be used for photographing.

Third Embodiment

In the described first and second embodiments, in order to set the finder magnification corresponding to the substantial focal length, the rotation of the zoom cam ring is transmitted to the finder cam, and in order to switch the photographing mode from the normal photographing mode to the trimming photographing mode or switch the same inversely by the rotation of the zoom cam ring, the finder cam is provided with a cam groove of a special form for driving the finder lens.

In the third embodiment, the turning angle of the zoom cam ring is detected to obtain the substantial focal length information set in the zoom lens, and the photographing mode information showing the normal photographing mode or the trimming photographing mode, according to the substantial focal length information and the photographing mode information, the finder focal length information to be set in the finder is computed, and according to the finder focal length information, the finder lens is driven to set the angle of view of the finder corresponding to the substantial focal length.

Figure 6:
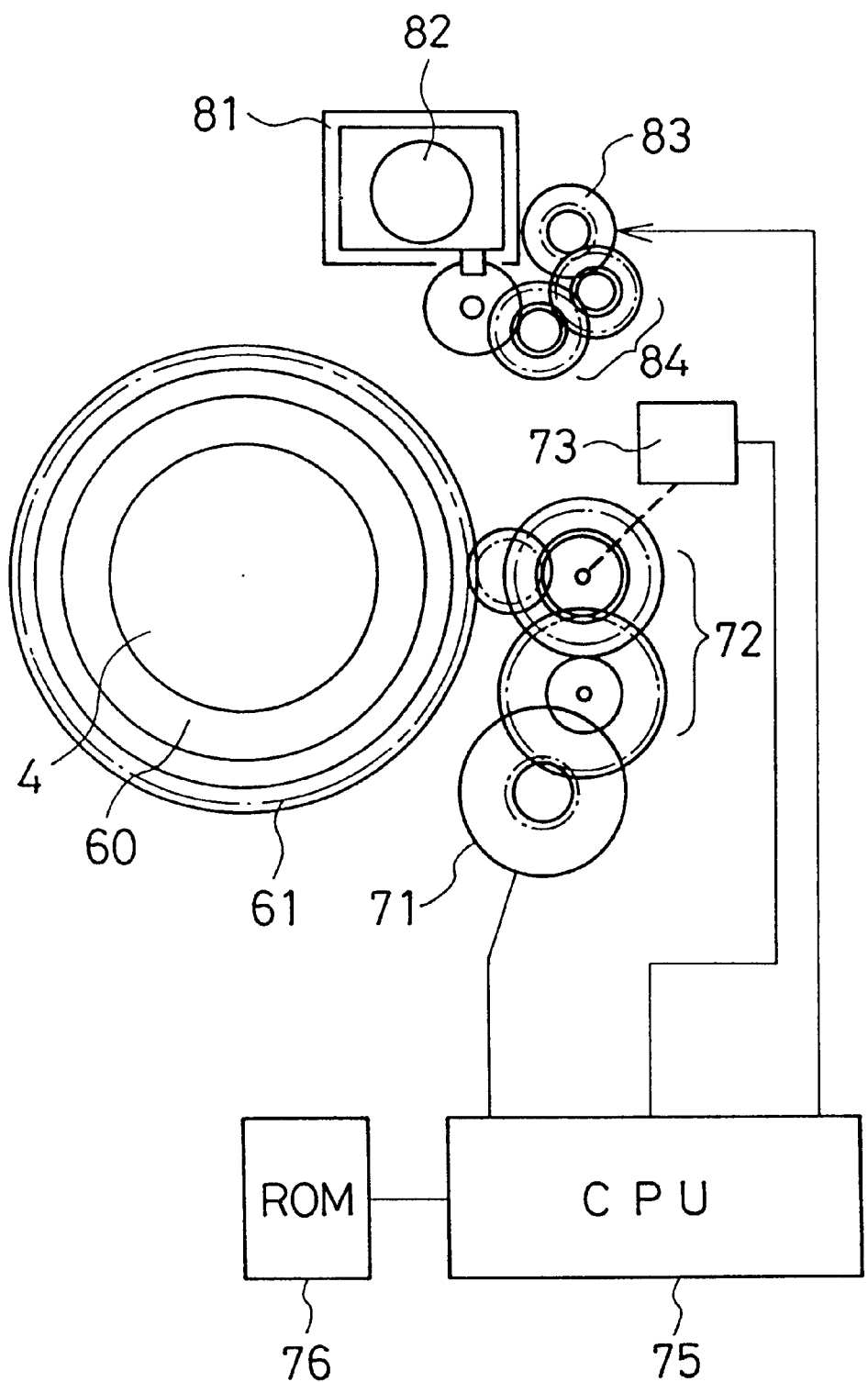
FIG. 6 is a diagram for explaining the principal part of the configuration of a photographing optical system and a finder optical system according to a third embodiment.

FIG. 6 is a diagram for explaining the configuration of the third embodiment. The general configuration of the camera is not different from that of the first embodiment shown in FIGS. 1 and 2, so the description is omitted. Further, the constitution of the rectilinear lens barrel for holding the zoom lens, the zoom cam ring, and a cam groove provided in the zoom cam ring and the relationship among the turning angle of the zoom cam ring, the real focal length of the zoom lens and the angle of view of the finder are not different from those of the first embodiment shown in FIGS. 3 and 4, so the description is omitted, and if necessary, FIGS. 3 and 4 should be referred.

In FIG. 6, the reference numeral 60 is a rectilinear lens barrel for holding the zoom lens 4, the reference numeral 61 is a zoom cam ring, and a known zoom lens structure is provided in the interior of the rectilinear lens barrel 60 and the zoom cam ring 61, and when the zoom cam ring 61 is rotated by zooming operation, the rectilinear lens barrel 60 is moved to set a desired focal length in the zoom lens 4.

The zoom cam ring 61 is driven through a speed reducing gear mechanism 72 by a zoom motor 71 as a driving source, and the turning angle of the zoom cam ring 61 is detected by an encoder 73 to be input to a control circuit (formed by CPU) 75 as substantial focal length information.

On the other hand, the finder 81 is provided with a finder lens 82 for changing the angle of view of the finder in the finder optical system, and the finder lens 82 is driven through a speed reducing gear mechanism 84 by a finder motor 83 as a driving source.

In the above configuration, when the zoom switch 14 (See FIG. 2) is operated, the zoom motor 71 as a driving source is operated to rotate the zoom cam ring 61 through the speed reducing gear mechanism 72. By the operation of the zoom switch 14, the focal length corresponding to the turning angle of the zoom cam ring 61 at that time is set in the zoom lens. By continued operation of the zoom switch 14 to the telephoto side, the transition from the normal photographing mode to the trimming photographing mode can be caused. On the contrary, continued operation of the zoom switch 14 to the wide-angle side, causes the transition from the trimming photographing mode to the normal photographing mode.

On the other hand, the encoder 73 detects the turning angle of the zoom cam ring 61, and the detection signal is input to the control circuit 75. The control circuit 75 displays information showing the substantial focal length on a display device not shown according to the detection signal, and determines whether the photographing mode is the normal photographing mode or the trimming photographing mode according to the operation of the zoom switch 14.

Further, the control circuit 75 computes the angle of view of the finder optical system according to the photographing mode and the substantial focal length information set by the zoom cam ring 61, operates the finder motor 83 by designated number of revolution to attain the computed angle of view, and drives the finder lens 82 through the speed reducing gear mechanism 84, whereby the angle of view corresponding to the photographing mode and the substantial focal length set in the zoom cam ring 61 is set in the finder optical system.

The control operation of the control circuit 75 can be simplified and facilitated by previously determining the necessary parameters such as the relationship between the turning angle of the zoom cam ring 61 and the photographing mode, the relationship between the turning angle of the zoom cam ring 61 and the focal length set in the zoom lens, the relationship between the angle of view of the finder optical system and the rotating speed of the finder motor 83, and the like by experiments or the like and numerically representing the same to be stored in the ROM 76.

Thus, the camera dispenses with the finder cam and its related structure, so that the mechanism part of the camera can be simply constructed.

According to the structure, as described above in detail, it will be apparent that with the camera, in switching the photographing mode, in the case of transition from the normal photographing mode to the trimming photographing mode, for example, the transition to the trimming photographing mode is caused by further performing the zooming operation from the maximum telephotograph position in the normal photographing mode, and in the case of transition from the trimming photographing mode to the normal photographing mode, the transition to the normal photographing mode is caused by further performing the zooming operation from the maximum wide angle position in the trimming photographing mode. Further, the finder can be always set to a suitable angle of view corresponding to the set substantial focal length.

Thus, the photographing mode can be simply switched, and since the finder is always set to a suitable angle of view, at the time of seeing through the finder, a feeling of physical disorder will not be given to a photographer by switching of the photographing mode.

What is claimed is:

1. A camera, comprising:
    a photographing mode setting device to selectively set a normal photographing mode or a trimming-photographing mode, wherein the trimming photographing mode is a mode configured to produce a part of a photographing image;
    a zoom lens including a focal length variator configured to set an arbitrary focal length corresponding to the normal photographing mode and the trimming photographing mode, said focal length variator being adapted to move the focal length of said zoom lens set to the telephoto side of the normal photographing area to the wide angle side during a transition time the normal photographing mode to the trimming photographing mode; and
    a viewfinder including a view-angle variator to change an angle of view corresponding to the focal length set in said zoom lens, said variator configured to change the angle of view of the viewfinder narrower continuously before, during and after the transition time from the normal photographing mode to the trimming photographing mode, wherein
    starting and terminating the focal length variation of said zoom lens and the change of angle of view of said viewfinder occur substantially simultaneously.

2. A camera according to claim 1, wherein said photographing mode setting device is a switch also used as a zooming switch for operating said zoom lens, whereby when the focal length set in a lens by operation of said zooming switch reaches the end on the telephoto side of the normal photographing area in the normal photographing mode, the transition to the trimming photographing mode occurs, and when the focal length set in a lens by operation of said zooming switch reaches the end on the wide angle side of the trimming photographing area in the trimming photographing mode, the transition to the normal photographing mode occurs.

3. A camera, comprising:
    a photographing mode setting device to selectively set a normal photographing mode or a trimming photographing mode, wherein the trimming photographing mode is a mode configured to produce a part of a photographing image;

a zoom lens including a focal length variator configured to set an arbitrary focal length corresponding to the normal photographing mode and the trimming photographing mode, said focal length variator is a zoom cam to change the focal length of said zoom lens, said zoom cam includes a first cam corresponding to a normal photographing area, a second cam corresponding to a trimming photographing area, and a transition area cam connecting said first cam and said second cam, and during a transition time from the focal length set in said zoom lens from the end on the telephoto side in the normal photographing area to the trimming photographing area, said transition area cam moves the focal length set in the photographing zoom lens to the wide angle side; and a view finder including a view-angle variator to change an angle of view corresponding to the focal length set in said zoom lens, said variator being adapted to change the angle of view of the viewfinder narrower continuously before, during and after the time of transition from the normal photographing mode to the trimming photographing mode, wherein starting and terminating the focal length variation of said zoom lens and the change of angle of view of said viewfinder occur substantially simultaneously.

4. A camera according to claim 3, wherein said transition area is not used as a zoom position of said zoom lens.

5. A camera, comprising:

a photographing mode setting device to selectively set a normal photographing mode or a trimming-photographing mode, wherein the trimming photographing mode is a mode configured to produce a part of a trimming photographing image;

a zoom lens including a focal length variator configured to set plural designated focal lengths preset in the normal photographing area corresponding to the normal photographing mode and in the trimming photographing are a corresponding to the trimming photographing mode, respectively, said focal length variator being adapted to move the focal length of said zoom lens set to the telephoto side of the normal photographing area to the wide angle during a transition time to the normal photographing mode to the trimming photographing mode; and a viewfinder including a view-angle variator to change an angle of view corresponding to the focal length set in said zoom lens, said variator configured to change the angle of view of the viewfinder narrower continuously before, during and after the time of transition from the normal photographing mode to the trimming photographing mode, wherein starting and terminating the focal length variation of said zoom lens and the change of angle of view of said viewfinder occur substantially simultaneously.

6. A camera according to claim 5, wherein said photographing mode setting device is a switch also used as a zooming switch for operating said zoom lens, whereby when the focal length set in a lens by operation of said zooming switch reaches the end on the telephoto side of the normal photographing area in the normal photographing mode, the transition to the trimming photographing mode occurs, and when the focal length set in a lens by operation of said zooming switch reaches the end on the wide angle side of the trimming photographing area in the trimming photographing mode, the transition to the normal photographing mode occurs.

7. A camera, comprising:

a photographing mode setting device to selectively set a normal photographing mode or a trimming photographing mode, wherein the trimming photographing mode is a mode configured to produce a part of a trimming photographing image;

a zoom lens including a focal length variator configure to set plural designated focal lengths preset in the normal photographing area corresponding to the normal photographing mode and in the trimming photographing area corresponding to the trimming photographing mode, respectively, said focal length variator is a zoom cam for changing the focal length of said zoom lens, said zoom cam includes a first cam corresponding to said normal photographing area, a second cam corresponding to said trimming photographing area, and a transition area cam connecting said first cam and said second cam, and during a transition time from the focal length set in said zoom lens from the end on the telephoto side in the normal photographing area to the trimming photographing area, said transition area cam moves the focal length set in the photographing zoom lens to the wide angle side; and a view finder including a view-angle variator to change an angle of view corresponding to the focal length set in said zoom lens, said variator being adapted to change the angle of view of the viewfinder narrower continuously before, during and after the time of transition from the normal photographing mode to the trimming photographing mode, wherein starting and terminating the focal length variation of said zoom lens and the change of angle of view of said viewfinder occur substantially simultaneously.

8. A camera according to claim 7, wherein said transition area is not used as a zoom position of said zoom lens.

9. A camera, comprising:

a photographing mode setting device for selectively setting the normal photographing mode or the trimming-photographing mode, wherein, the trimming photographing mode is a mode of being scheduled to print a part of photographing image plane in the print processing after photographing;

a zoom lens including a focal length variator capable of setting an arbitrary focal length corresponding to the normal photographing mode and the trimming photographing mode;

a viewfinder including a variator for changing the angle of view corresponding to the focal length set in said zoom lens; and wherein at the time of transition from the normal photographing mode to the trimming photographing mode, the focal length of said zoom lens moves to the wide angle side and the angle of view of the viewfinder changes to narrower side, and at the end of transition, a size of a photographing field corresponding to the part of the photographing image plane coincide with a size of the field of view.

10. A camera according to claim 9, wherein said transition area is not used as a zoom position of said zoom lens.

11. A camera, comprising:

a photographing mode setting device to selectively set a normal photographing mode or a trimming-photographing mode, wherein the trimming photographing mode is a mode configured to produce a part of a photographing image; and a zoom lens including a focal length variator configured to set an arbitrary focal length corresponding to the normal photographing mode and the trimming photographing mode, wherein said focal length variator is a zoom cam for changing the focal length of said zoom lens, said zoom cam includes a first cam corresponding to a normal photographing area, a second cam corresponding to a trimming photographing area, and a transition area cam connecting said first cam and said second cam, and during a transition time from the focal length set in said zoom lens from the end on the telephoto side in the normal photographing area to the trimming photographing area, said transition area cam moves the focal length set in the photographing zoom lens to the wide angle side; and a viewfinder including a view-angle variator to change an angle of view corresponding to the focal length set in said zoom lens, wherein at the time of transition from the normal photographing mode to the trimming photographing mode, the focal length of said zoom lens moves to the wide angle side and the angle of view of the viewfinder changes to narrower side, and at the end of transition, a size of a photographing field corresponding to the part of the photographing image plane coincide with a size of the field of view.

12. A camera according to claim 11, wherein said photographing mode setting device is a switch also used as a zooming switch for operating said zoom lens, whereby when the focal length set in a lens by operation of said zooming switch reaches the end of the telephoto side of the normal photographing area in the normal photographing mode, the transition to the trimming photographing mode occurs, and when the focal length set in a lens by operation of said zooming switch reaches the end on the wide angle side of the trimming photographing area in the trimming photographing mode, the transition to the normal photographing mode occurs.

13. A camera, comprising:

a photographing mode setting device for selectively setting the normal photographing mode or the trimming-photographing mode, wherein the trimming photographing mode is a mode of being scheduled to print a processing after photographing image plane in the print processing after photographing;

a zoom lens including a focal length variator capable of setting plural designated focal lengths preset in the normal photographing area corresponding to the normal photographing mode and the trimming photographing area corresponding to the trimming photographing mode, respectively;

a viewfinder including a variator for changing the angle of view corresponding to the focal length set in said zoom lens; and wherein at the time of transition from the normal photographing mode to the trimming photographing mode, the focal length of said zoom lens moves to the wide angle side and the angle of view of the viewfinder changes to narrower side, and at the end of transition, a size of a photographing field corresponding to the part of the photographing image plane coincide with a size of the field of view.

14. A camera according to claim 13, wherein said photographing mode setting device is a switch also used as a zooming switch for operating said zoom lens, whereby when the focal length set in a lens by operation of said zooming switch reaches the end of the telephoto side of the normal photographing area in the normal photographing mode, the transition to the trimming photographing mode occurs, and when the focal length set in a lens by operation of said zooming switch reaches the end of the wide angle side of the trimming photographing area in the trimming photographing mode, the transition to the normal photographing mode occurs.

15. A camera, comprising:

a photographing mode setting device to selectively set a normal photographing mode or a trimming-photographing mode, wherein the trimming photographing mode is a mode configured to produce a part of a photographing image;

a zoom lens including a focal length variator configured to set plural designated focal lengths preset in the normal photographing area corresponding to the normal photographing mode and in the trimming photographing area corresponding to the trimming photographing mode, respectively, wherein said focal length variator is a zoom cam for changing the focal length of said zoom lens, said zoom cam includes a first cam corresponding to said normal photographing area, a second cam corresponding to said trimming photographing area, and a transition area cam connecting said first cam and said second cam, and during a transition time from the focal length set in said zoom lens from the end of the telephoto side in the normal photographing area to the trimming photographing area, said transition area cam moves the focal length set in the photographing zoom lens to the wide angle side;

a viewfinder including a view-angle variator to change an angle of view corresponding to the focal length set in said zoom lens; and wherein at the transition time from the normal photographing mode to the trimming photographing mode, the focal length of said zoom lens moves to the wide angle side and the angle of view of the viewfinder changes to narrower side, and at the end of transition, a size of a photographing field corresponding to the part of the photographing image plane coincide with a size of the field of view.

16. A camera according to claim 15, wherein said transition area is not used as a zoom position of said zoom lens.

* * * * *

UNITED STATES PATENT AND TRADEMARK OFFICE
CERTIFICATE OF CORRECTION

PATENT NO. : 6,507,703 B1
DATED : January 14, 2003
INVENTOR(S) : Fumiaki Ishito

It is certified that error appears in the above-identified patent and that said Letters Patent is hereby corrected as shown below:

Column 11,
Line 42, change "are a" to -- area --.

Signed and Sealed this

Twelfth Day of August, 2003

JAMES E. ROGAN
*Director of the United States Patent and Trademark Office*